United States Patent [19]

Baek

[11] Patent Number: 5,680,554

[45] Date of Patent: Oct. 21, 1997

[54] METHOD AND APPARATUS FOR ARBITRATING AMONG PROCESSORS FOR ACCESS TO A COMMON BUS

[75] Inventor: Seung-Gon Baek, Seoul, Rep. of Korea

[73] Assignee: SamSung Electronics Co., Ltd., Kyungki-do, Rep. of Korea

[21] Appl. No.: 539,039

[22] Filed: Oct. 4, 1995

[30] Foreign Application Priority Data

Jan. 16, 1995 [KR] Rep. of Korea .................. 95-622

[51] Int. Cl.⁶ .................. G06F 13/36; G06F 13/362; G06F 9/46

[52] U.S. Cl. .................. 395/287; 395/291; 395/293; 395/729

[58] Field of Search .................. 395/287, 291, 395/293, 728–730, 294; 370/85.2, 85.6, 462; 340/825.5

[56] References Cited

U.S. PATENT DOCUMENTS

| | | | |
|---|---|---|---|
| 4,320,467 | 3/1982 | Glass | 395/301 |
| 4,785,394 | 11/1988 | Fischer | 395/294 |
| 4,920,486 | 4/1990 | Nielsen | 395/291 |
| 5,034,881 | 7/1991 | Hoashi et al. | 395/303 |
| 5,038,274 | 8/1991 | Nielsen | 395/301 |
| 5,068,782 | 11/1991 | Scheuneman et al. | 395/478 |
| 5,088,024 | 2/1992 | Vernon et al. | 395/291 |
| 5,151,994 | 9/1992 | Wille et al. | 395/800 |
| 5,193,197 | 3/1993 | Thacker | 395/303 |
| 5,195,185 | 3/1993 | Marenin | 395/303 |
| 5,261,109 | 11/1993 | Cadambi et al. | 395/291 |
| 5,265,223 | 11/1993 | Brockmann et al. | 395/303 |
| 5,274,774 | 12/1993 | Manber et al. | 395/305 |
| 5,280,591 | 1/1994 | Garcia et al. | 395/291 |
| 5,283,902 | 2/1994 | Dom | 395/301 |
| 5,307,466 | 4/1994 | Chang | 395/301 |
| 5,349,690 | 9/1994 | Frame et al. | 395/800 |
| 5,388,228 | 2/1995 | Heath et al. | 395/303 |
| 5,404,538 | 4/1995 | Krappweis, Sr. | 395/737 |
| 5,420,985 | 5/1995 | Cantrell et al. | 395/293 |
| 5,430,848 | 7/1995 | Waggener | 395/303 |
| 5,432,911 | 7/1995 | Mura et al. | 364/131 |
| 5,434,984 | 7/1995 | Deloddere et al. | 395/288 |
| 5,485,586 | 1/1996 | Brash et al. | 395/292 |
| 5,509,125 | 4/1996 | Johnson et al. | 395/300 |
| 5,546,548 | 8/1996 | Chen et al. | 395/296 |

*Primary Examiner*—Gopal C. Ray
*Attorney, Agent, or Firm*—Robert E. Bushnell, Esq.

[57] ABSTRACT

A method and apparatus for arbitrating among a plurality of processors for access to a common system bus in a multi-processing system are provided. The bus arbitrating method includes the steps of detecting a request signal from a processor requesting access to the system bus, checking the number of other processors in the system requesting access to the system bus, providing access to the system bus by considering a priority factor among competing processors when the number of processors requesting access to the system bus is below a predetermined number, and providing access to the system bus by considering only a fairness factor when the number of processors requesting access to the system bus is not below the predetermined number. Accordingly, bus access speed can be improved by considering principles of both fairness and priority.

23 Claims, 11 Drawing Sheets

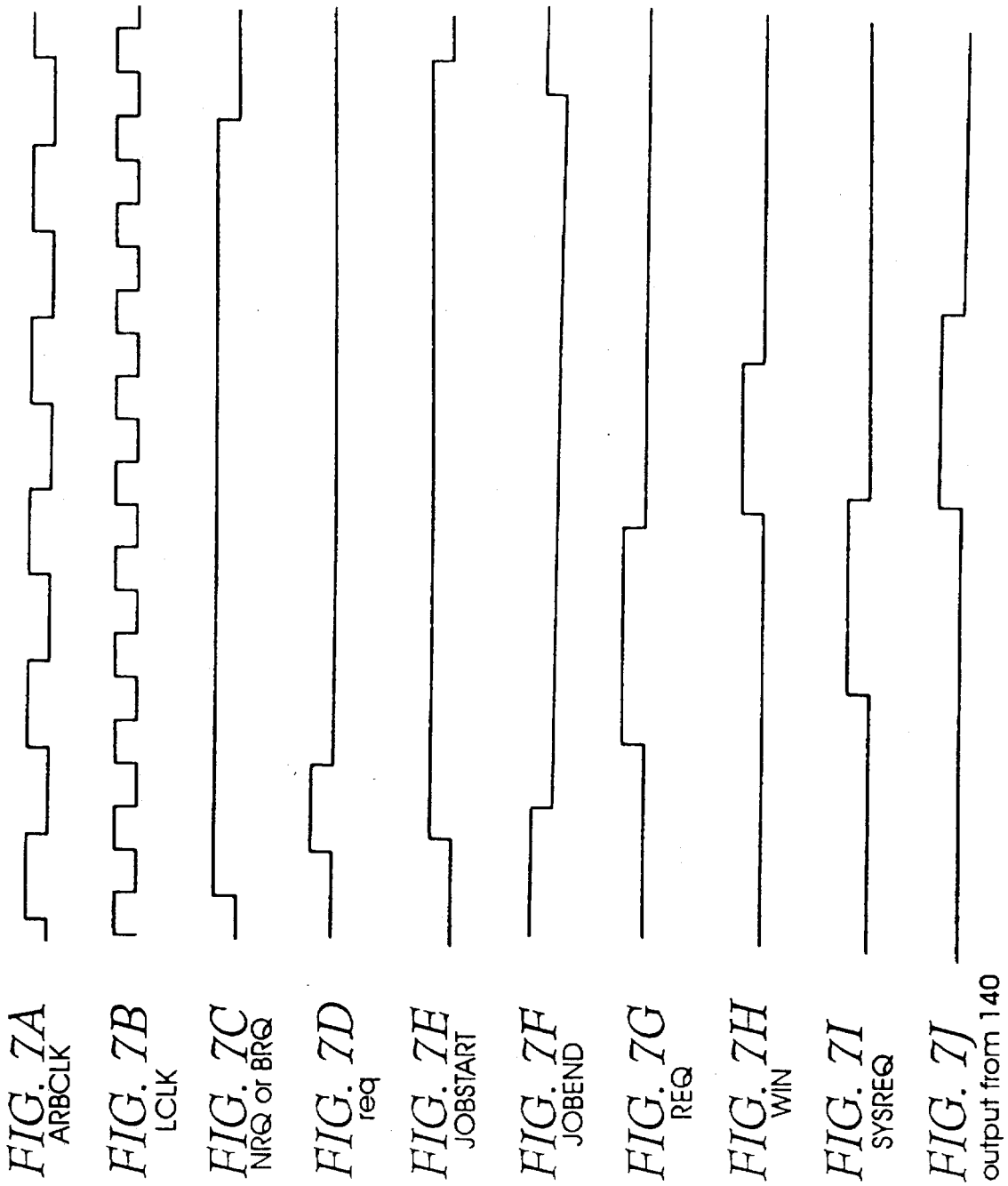

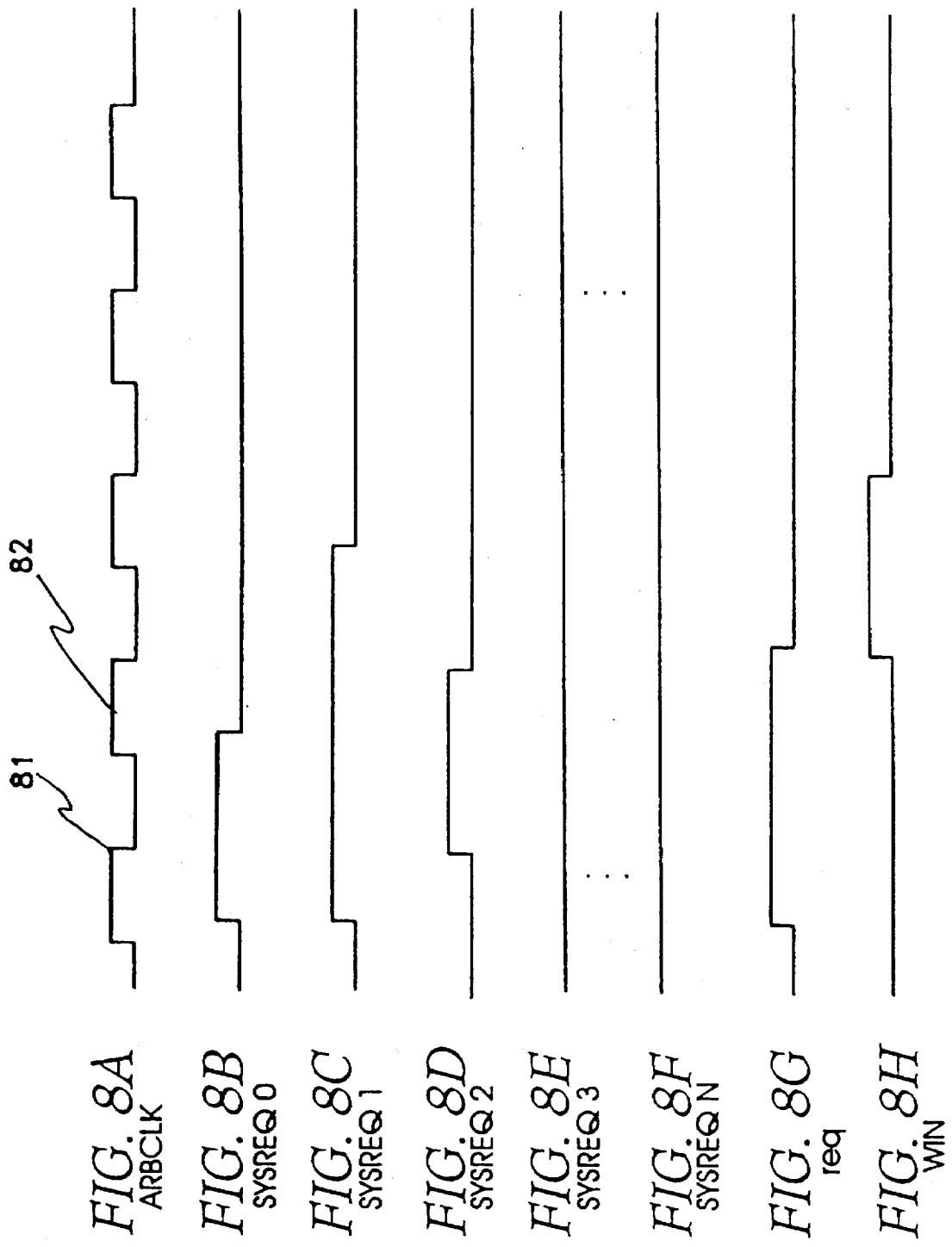

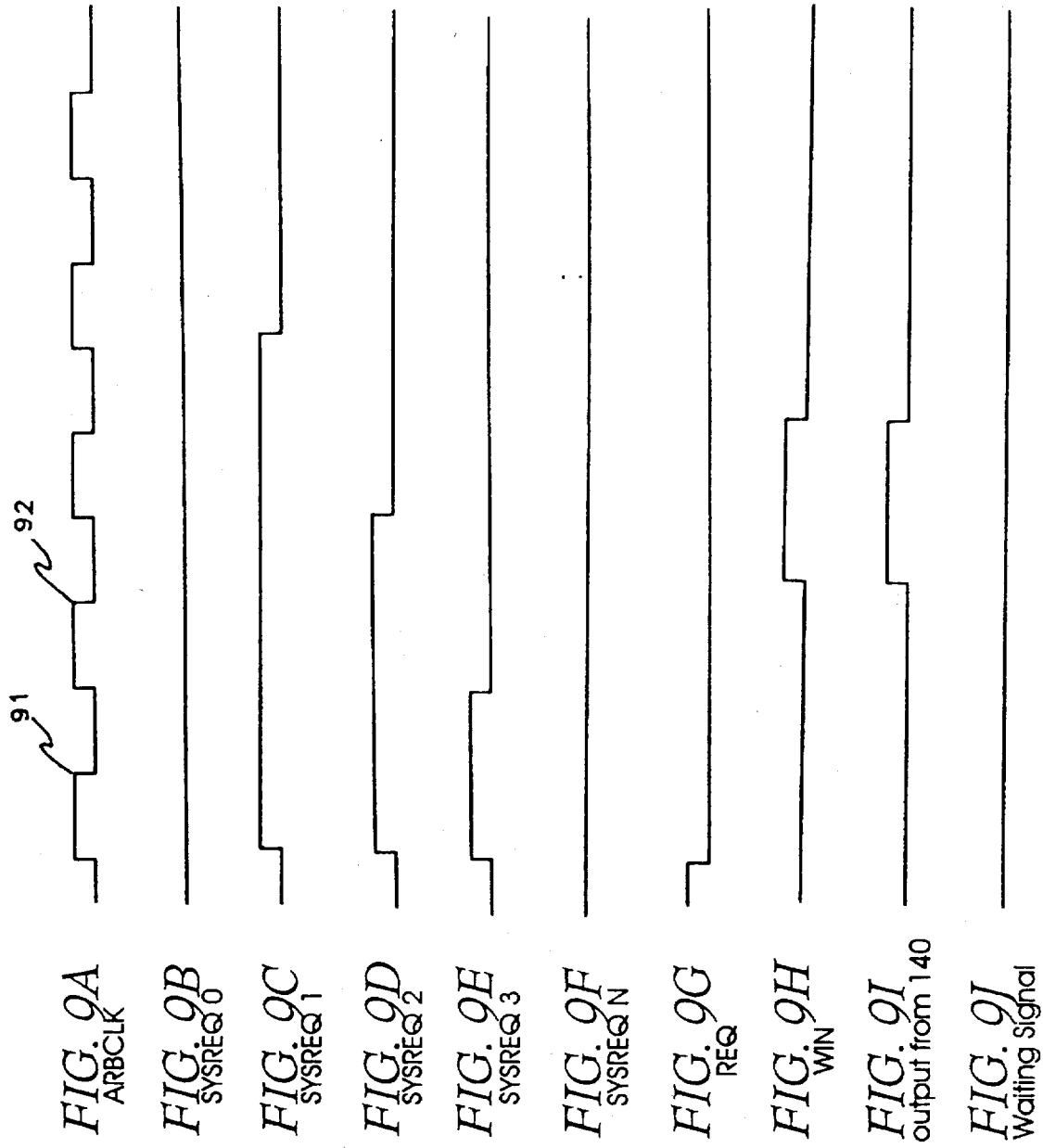

1

METHOD AND APPARATUS FOR ARBITRATING AMONG PROCESSORS FOR ACCESS TO A COMMON BUS

CROSS-REFERENCE TO RELATED APPLICATIONS

This application makes reference to, incorporates the same herein, and claims all benefits accruing under 35 U.S.C. §119 from an application for Distributed Arbiter earlier filed in the Korean Industrial Property Office on 16 Jan. 1995 and assigned Serial No. 622/1995.

BACKGROUND OF THE INVENTION

The present invention relates to a method and apparatus for arbitrating among a plurality of agents for access to a common resource, and more particularly, to a method and apparatus for arbitrating among a plurality of processors for access to a common bus.

In a multi-processing system, multiple operations are simultaneously performed using a plurality of processors that are connected to a common bus or communication link. When two or more processors simultaneously require use of the common bus, an arbitrating method is needed to properly assign the right to use the common bus. Two general arbitrating methods include centralized arbitration and distributed arbitration. The centralized arbitration method, which is disclosed in U.S. Pat. No. 5,280,591 and will be discussed in detail later, uses a single arbiter to batch-process a resource assigning requirement of a plurality of processors. With the distributed arbitrating method, which is disclosed in U.S. Pat. No. 5,307,466 and will be discussed in detail later, each processor has a designated arbiter.

With distributed arbitration, a given processor requiring resource assignment first checks a current state of bus usage. Then, arbitration is performed according to a predetermined algorithm to determine which processor within the system has the present right to access the common bus. This determination can be based on factors, such as "fairness" and "priority". The "fairness" factor is based on equally providing all processors with the right to use the common bus, and can be implemented using a round-robin technique. The "priority" factor is based on providing a processor with the present right to use the common bus according to the priority of each processor. For example, it may be desirable in certain instances to provide memory devices requesting access to a system bus a higher priority than other processors or I/O devices. Conventional systems generally consider only one of the these two factors in determining bus access. Accordingly, I have discovered that incorporating both of these factors into one system in a particular manner can provide advantages not produced by the conventional systems.

SUMMARY OF THE INVENTION

Accordingly, it is an object of the present invention to provide an improved bus arbitration method and device.

It is another object to provide a bus arbitration method and device that provides improved arbitration speed.

It is still another object to provide a bus arbitration method and device in which a "fairness" factor is considered in determining which processor has a present right of access to a system bus.

It is yet another object to provide a bus arbitration method and device in which a "priority" factor is considered in determining which processor has a present right of access to a system bus.

It is still yet another object to provide a bus arbitration method and device in which both a "fairness" factor and a "priority" factor are considered in determining which processor has a present right of access to a system bus.

It is a further object to provide a bus arbitration method and device in which a "priority" factor is considered in determining which processor has a present right of access to a system bus only when a predetermined condition is satisfied.

To achieve these and other objects, there is provided a bus arbitration method comprising the steps of: detecting a request signal from a processor requesting access to a system bus; checking the number of other processors within the system requesting access to the system bus; providing access to the system bus based on the priority when the number of processors requesting access to the system bus is below the predetermined number; and providing access to the system bus based on fairness using a round-robin scheduling method when the number of processors requesting access to the system bus is not below the predetermined number.

There is also provided a bus arbiter comprising: request signal processing means for checking the state of a system bus in response to a system bus request signal generated by a processor requesting access to the system bus and for generating a control signal when the number of processors requesting access to the system bus is below a predetermined number; and priority comparing means for allowing a processor within the system to access the system bus based on priority when the control signal is generated, and for allowing a processor within the system to access the system bus based on fairness when the control signal is not generated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 7A–7J are operational waveforms illustrating the operation of the bus arbiter of FIG. 5 according to the principles of the present invention;

FIGS. 8A–8H are operational waveforms illustrating the operation for determining the state of a system bus according to the principles of the present invention; and FIGS. 9A–9J are operational waveforms illustrating the operation for determining which processor has a present right of access to a system bus according to the principles of the present invention.

DETAILED DESCRIPTION OF THE PRESENT INVENTION

Figure 1:
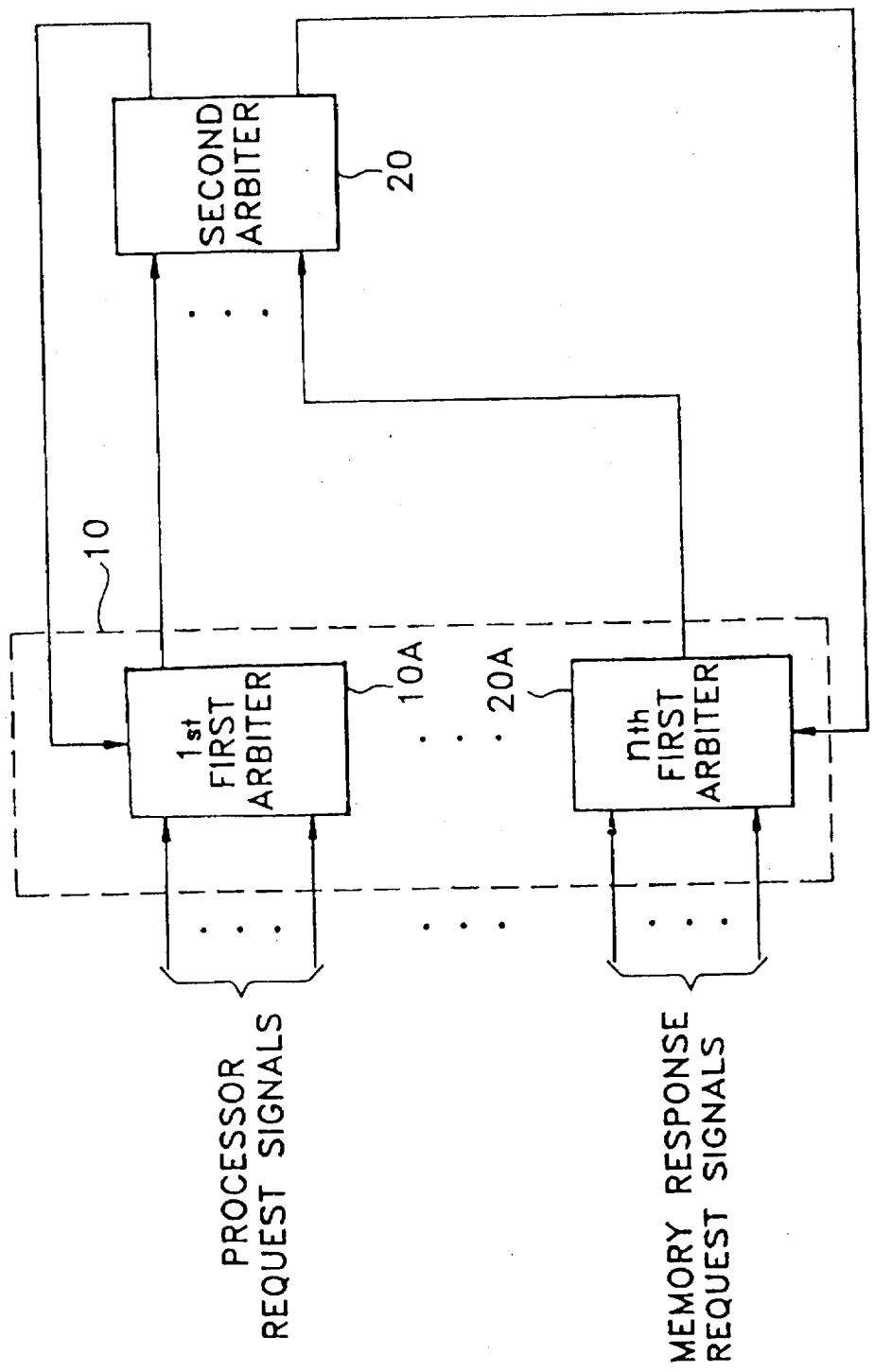
FIG. 1 is a block diagram illustrating a conventional arbiter using a centralized arbitration method.

Turning now to the drawings and referring to FIG. 1, a conventional arbiter employing a centralized arbitration method will be described. FIG. 1 is a block diagram for illustrating a conventional arbiter (see U.S. Pat. No. 5,280, 591) which provides access to a system bus based on the aforementioned "fairness" factor. The conventional arbiter of FIG. 1 is composed of a first arbiter 10 and a second arbiter 20. First arbiter 10 includes a plurality of arbiters, such as an arbiter 10A for arbitrating bus access using a round-robin scheduling method by receiving processor request signals from each processor, and an arbiter 20A for arbitrating bus access using the round-robin scheduling method by receiving memory request signals from each memory. Second arbiter 20 ultimately provides bus access to one of the plurality of first arbiters 10 using the round-robin scheduling method.

Regarding operation, first and second arbiters 10 and 20 guarantee "fairness" to each of the processors by using the round-robin scheduling method. The round-robin scheduling method equally assigns the right to use the common bus to all processors by authorizing each processor in turn to use the bus. With centralized arbitration methods, however, since bus access is ultimately determined by one arbiter, bus request signal transmission, bus request signal recognition, arbitration, authorization signal transmission, authorization signal reception, request signal interruption, bus driver delay time and the like cause reductions in access speed. Also, if the arbiter is out of order, the whole system stops. In cases where the "fairness" factor is considered by using the round-robin scheduling method, since a processor which has just used the common bus has the right to use the common bus again only after the remaining processors use the common bus, undue delays in bus access can occur. Furthermore, if consideration of the "priority" factor is additionally provided in order to solve the above problem, the complexity of hardware is increased and processing speed is thereby reduced.

Figure 2:
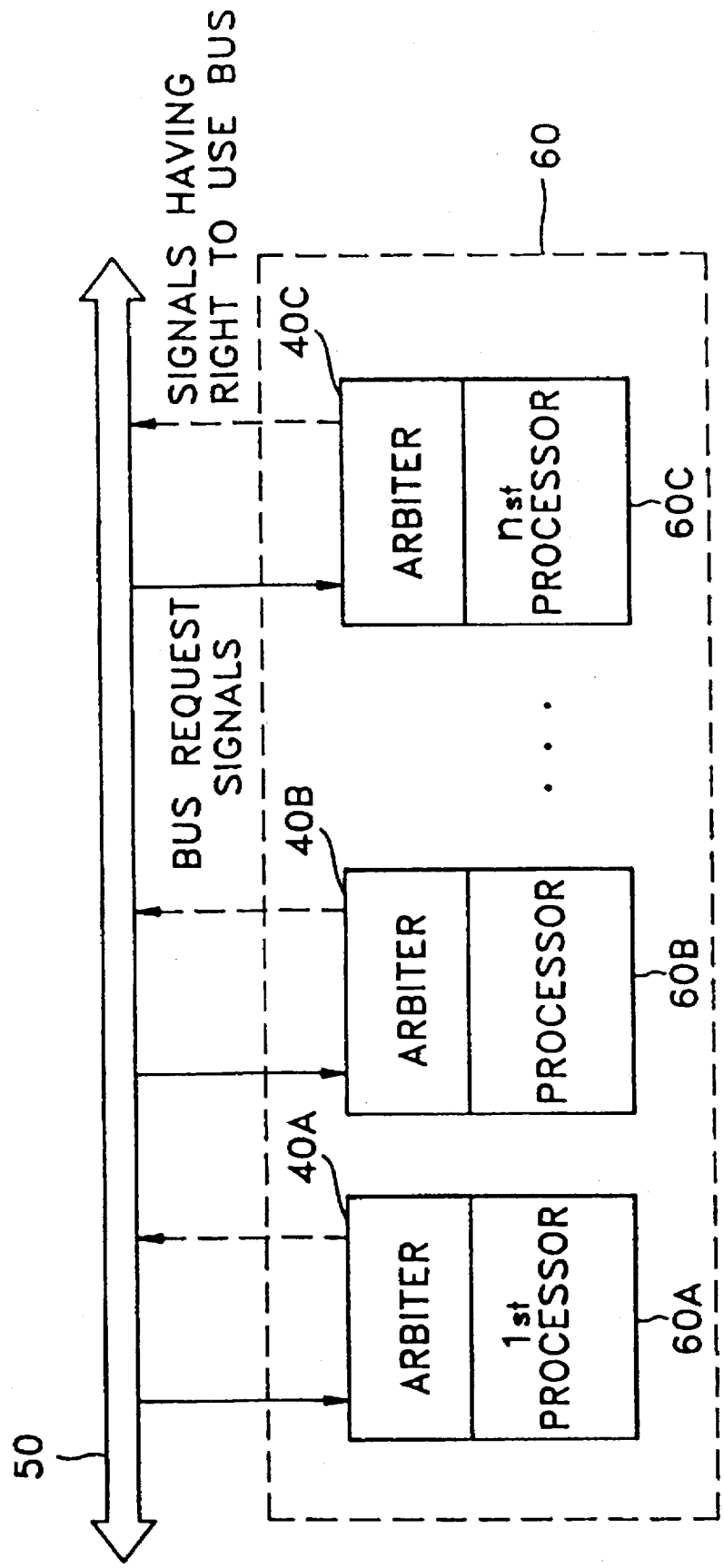
FIG. 2 is a block diagram illustrating a conventional arbiter using a distributed arbitration method.

Referring now to FIG. 2, a conventional arbiter employing a distributed arbitration method will be described. In the conventional arbiter of FIG. 2 (for example, see U.S. Pat. No. 5,307,466), arbiters 40A, 40B and 40C each determine priority of use for a given processor by comparing bus request signals. In this configuration, priority can be changed according to a program. Arbiters 40A, 40B and 40C perform an exclusive OR operation on bus request signals input via a bus 50 and a priority number of processors 60A, 60B and 60C, to thereby determine bus usage priority. The arbiters then generate a signal indicating bus usage (busy signal) by which the corresponding processor having priority to use the bus can do so. In this configuration, since one system bus clock is used for performing the exclusive OR operation, the system's speed is reduced by the arbitration. Also, since the "fairness" factor is not considered, a lower priority processor always has to wait to access bus 50 when a plurality of bus request signals are simultaneously generated. Moreover, the resources and effort needed for programming the priorities can be problematic.

The bus arbitration method according to the principles of the present invention employs a distributed arbitration scheme for arbitrating among a plurality of processors for access to a system bus. The method incorporates both the "fairness" factor and the "priority" factor.

Figure 3:
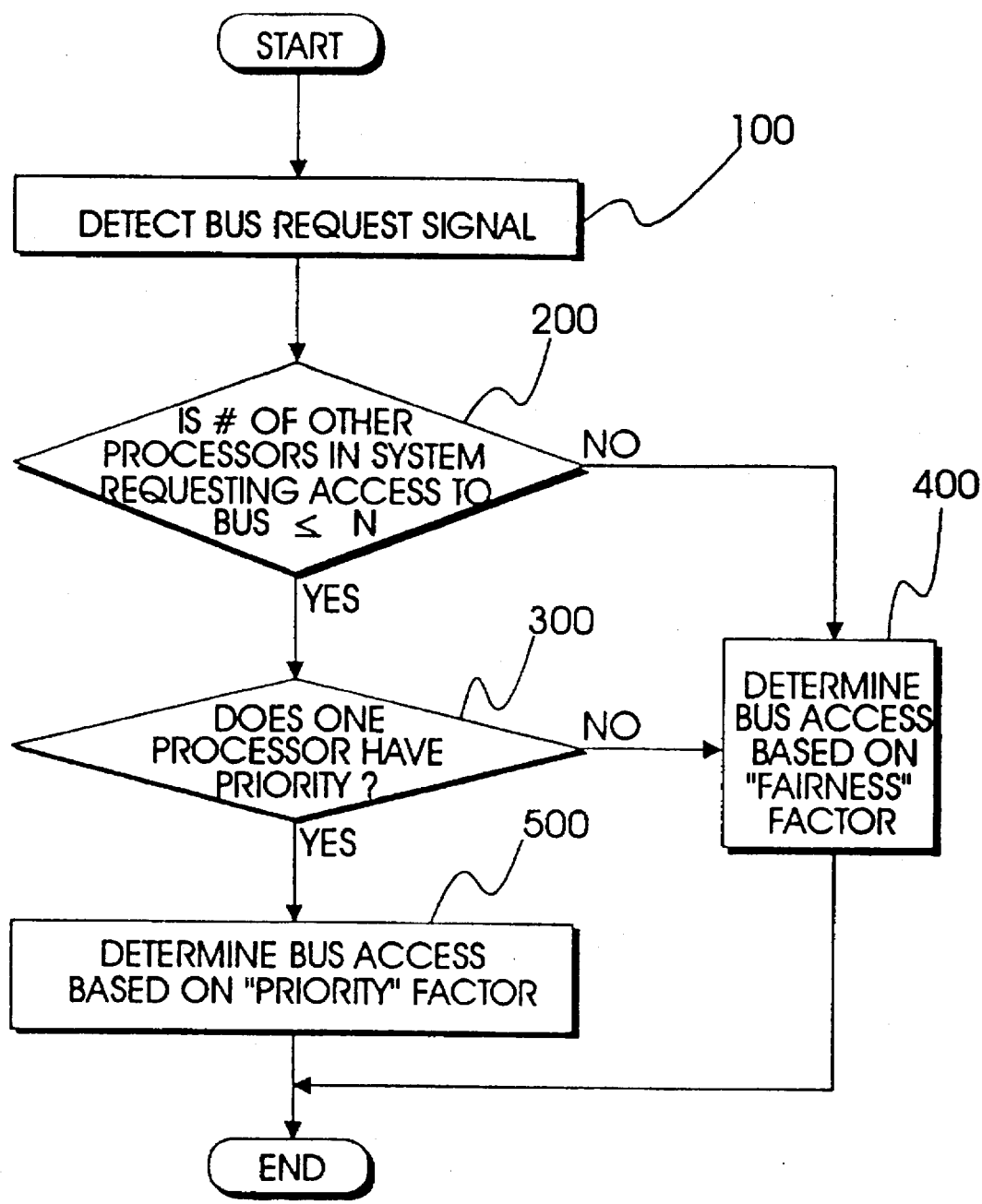
FIG. 3 is a flow chart illustrating a bus arbitration method according to the principles of the present invention.

Referring now to FIG. 3, the bus arbitration method according to the principles of the present invention will be described. First, when a processor requesting access to a system bus outputs a bus request signal, the bus request signal is detected, in step 100. Once the bus request signal is detected, a system bus state is evaluated to determine whether the number of processors in the system requesting present access to the system bus is less than or equal to a predetermined number N, in step 200. In the preferred embodiment of the present invention, N equals one; however, this number can altered depending upon system requirements. When the number of processors in the system requesting present access to the system bus is less than or equal to the predetermined number N, a determination is made, in step 300, as to whether one of the processors has priority over the other one(s). If, in step 300, one of the processors is determined to have priority, bus access is determined based on the aforementioned "priority" factor, in step 500, by granting bus access to the processor having the priority. On the other hand, if it is determined in step 200 that the number of processors in the system requesting present access to the system bus is not less than or equal to the predetermined number N, bus access is determined based on the aforementioned "fairness" factor, in step 400, by using the round-robin scheduling method that authorizes each processor in turn to use the bus. Similarly, if in step 300, it is determined that no one processor has priority, bus access is determined in step 400 based on the "fairness" factor. Accordingly, when several processors simultaneously request access to the system bus, access is determined based exclusively on the "fairness" factor which provides bus access using the round-robin method. It is only when the number of processors requesting access to the system bus is less than or equal to the predetermined number N that processor priority is even considered. Therefore, the bus arbitration method of the present invention advantageously utilizes principles of both "fairness" and "priority".

Figure 4:
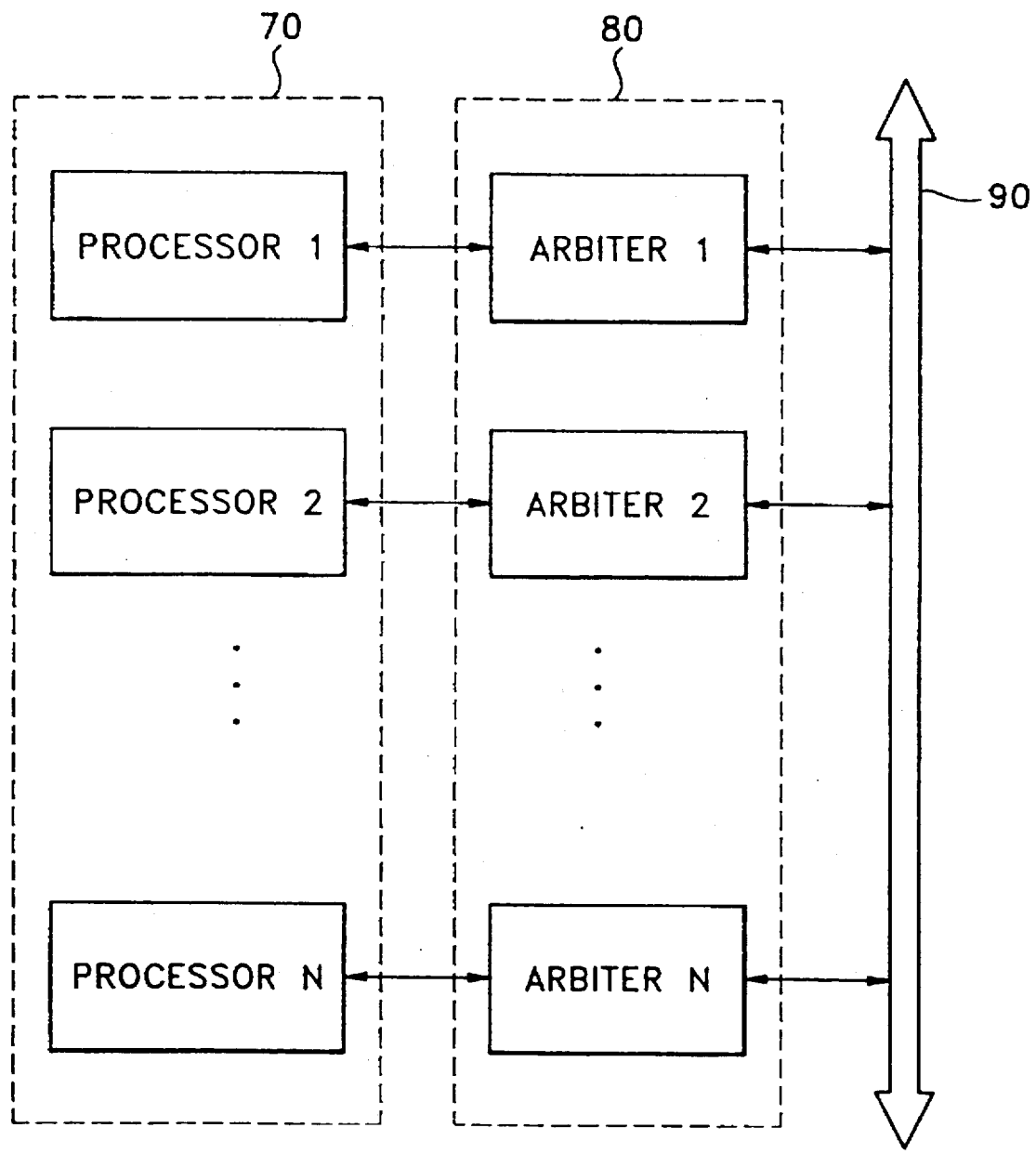
FIG. 4 is a schematic diagram illustrating the configuration of a bus arbiter system according to the principles of the present invention that employs the bus arbitration method of FIG. 3.

Referring now to FIG. 4, a schematic diagram illustrating the configuration of a bus arbiter constructed according to the principles of the present invention is shown. In FIG. 4, bus arbiters 80 are arranged between the internal buses of a plurality of processors 70 and a system bus 90.

Figure 5:
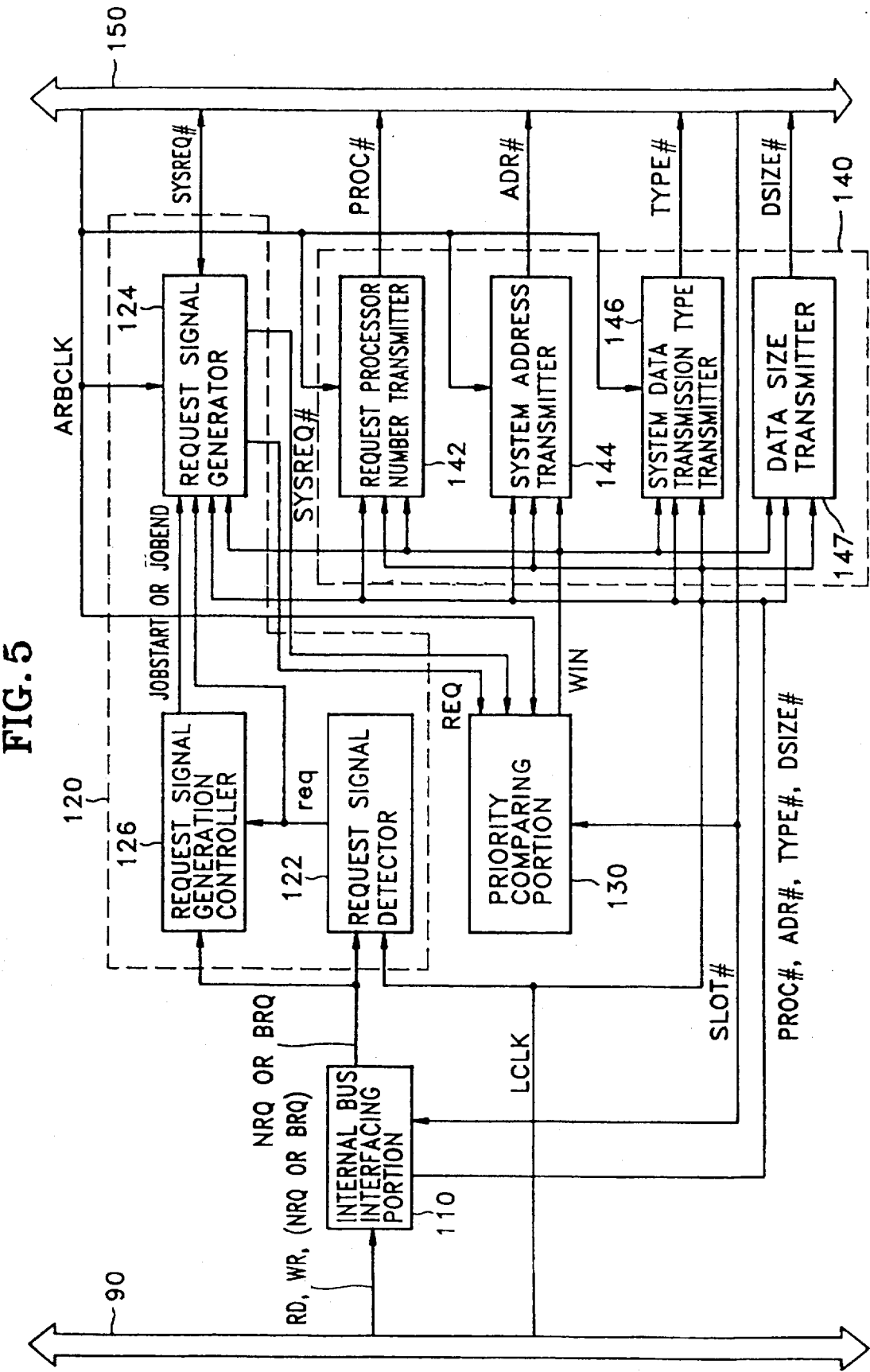
FIG. 5 is a block diagram illustrating the configuration of a single bus arbiter according to the principles of the present invention.

FIG. 5 is a block diagram of a single one of bus arbiters 80 of FIG. 4. The bus arbiter constructed according to the principles of the present invention is comprised of an internal bus interfacing unit 110 which is connected to an internal bus 95 of a corresponding one of the processors 70 of FIG. 4, a request signal processing circuit 120, a priority comparing unit 130 and a signal transmission circuit 140. Request signal processing circuit 120 is comprised of a request signal detector 122, a request signal generator 124 and a request signal generation controller 126.

Internal bus interfacing unit 110 receives NRQ, BRQ, RD and WR signals from internal bus 95 and a SLOT# signal from system bus 90 in synchronization with a corresponding internal clock signal LCLK, converts the received signals into a request processor number signal PROC#, a system address signal ADR#, a system data transmission type signal TYPE# and a data size signal DSIZE#, and outputs the converted signals to corresponding blocks. Here, NRQ represents the basic unit of a data transmission request signal, BRQ represents an integer multiple times the basic unit of the data transmission request signal, RD is read signal for a processor requesting bus access to read data from a system memory, WR is write signal for a processor requesting bus access to write data to a system memory, and SLOT# is a signal input from system bus 90 that indicates the order in which the processor may access system bus 90 relative to the other processors within the system (i.e., for purposes of "fairness"). This signal changes according to the location of the processor in the system. Request signal detector 122 generates a req signal and outputs the req signal to request signal generation controller 126 and request signal generator 124, in synchronization with internal clock signal LCLK of a corresponding processor when NRQ or BRQ signals are detected from internal bus interfacing unit 110. Request signal generation controller 126 generates a JOBSTART signal in response to the req signal to indicate that a request to access system bus 90 has been made, and generates a JOBEND signal when the processor's bus access has been completed so that generation of the NRQ and BRQ signals is interrupted. In response to the req and JOBSTART signals, request signal generator 124 generates a corresponding system request signal SYSREQ# and receives system request signals SYSREQ# for other processors within the system via system bus 90 to check the state of system bus 90. When the number of processors within the system currently requesting access to system bus 90 is one or less, request signal generator 124 generates a REQ signal in synchronization with a system bus arbitrating synchronous signal ARBCLK, and outputs the REQ signal to priority comparing unit 130 together with the system request signals SYSREQ# received from the other processors within the system. Transmission of the system request signal SYSREQ# for the corresponding processor is interrupted when a WIN signal is output from priority comparing unit 130. System request signals SYSREQ# represent the state of system bus 90 by indicating what processors are currently requesting access to system bus 90. Values for system request signals SYSREQ# are different for each of the processors within the system. Once the REQ signal is generated, priority comparing unit 130 checks system request signals SYSREQ# received from request signal generator 124 to determine whether a waiting signal is present. If one of the processors in the system has priority over the other processors to access system bus 90, a waiting signal is registered in a waiting signal generating register and the waiting signal is generated in system bus 90 so that the other processors in the system can not use system bus 90 (even if they are next in line to access system bus 90 on the basis of the "fairness" factor). Here, the processor which generates the waiting signal stores a bit in an internal register indicating that it has priority to use system bus 90. When a waiting signal is not present, priority comparing unit 130 compares SLOT# signal received from system bus 90 with system request signal(s) SYSREQ# of other processors in synchronization with system bus arbitrating synchronous signal ARBCLK, and generates the WIN signal when the corresponding processor is deemed to have the present right to access system bus 90. A processor requesting to access system bus 90 can use system bus 90 while the WIN signal is generated. When the processor having the right to use system bus 90 transmits data, the data may overlap or collide with data which was transmitted from a processor previously having the right to use system bus 90. In order to prevent this problem, the processor previously having the right to use system bus 90 momentarily stops bus arbitration for an amount of time it normally takes to transmit data.

Signal transmitting circuit 140 is comprised of a request processor number transmitter 142, a system address transmitter 144, a system data transmission type transmitter 146 and a data size transmitter 147. Signal transmitting circuit 140 receives the PROC#, ADR#, TYPE# and DSIZE# signals, which are for enabling use of system bus 90, from internal bus interfacing unit 110 in synchronization with internal bus synchronous signal LCLK and outputs the received signals to system bus 90 in synchronization with system bus arbitrating clock signal ARBCLK so that the corresponding processor requesting bus access can use system bus 90. The corresponding request processor number signal PROC# is determined in internal bus interfacing unit 110 by receiving SLOT# signal, while the ADR# signal represents a memory address from or in which the corresponding processor acquiring access to system bus 150 reads or writes data. The data transmission type signal TYPE# indicates the type of transmission (i.e., read or write), and data size signal DSIZE# represents the quantity (bit number) of data to be transmitted via system bus 90. The PROC#, ADR#, TYPE# and DSIZE# signals may be directly generated in signal transmitting circuit 140 by using a combination or sequential circuit after receiving signals NRQ, BRQ, RD and WR from the corresponding processor via internal bus 95 and SLOT# signal from system bus 90.

Figure 6A:
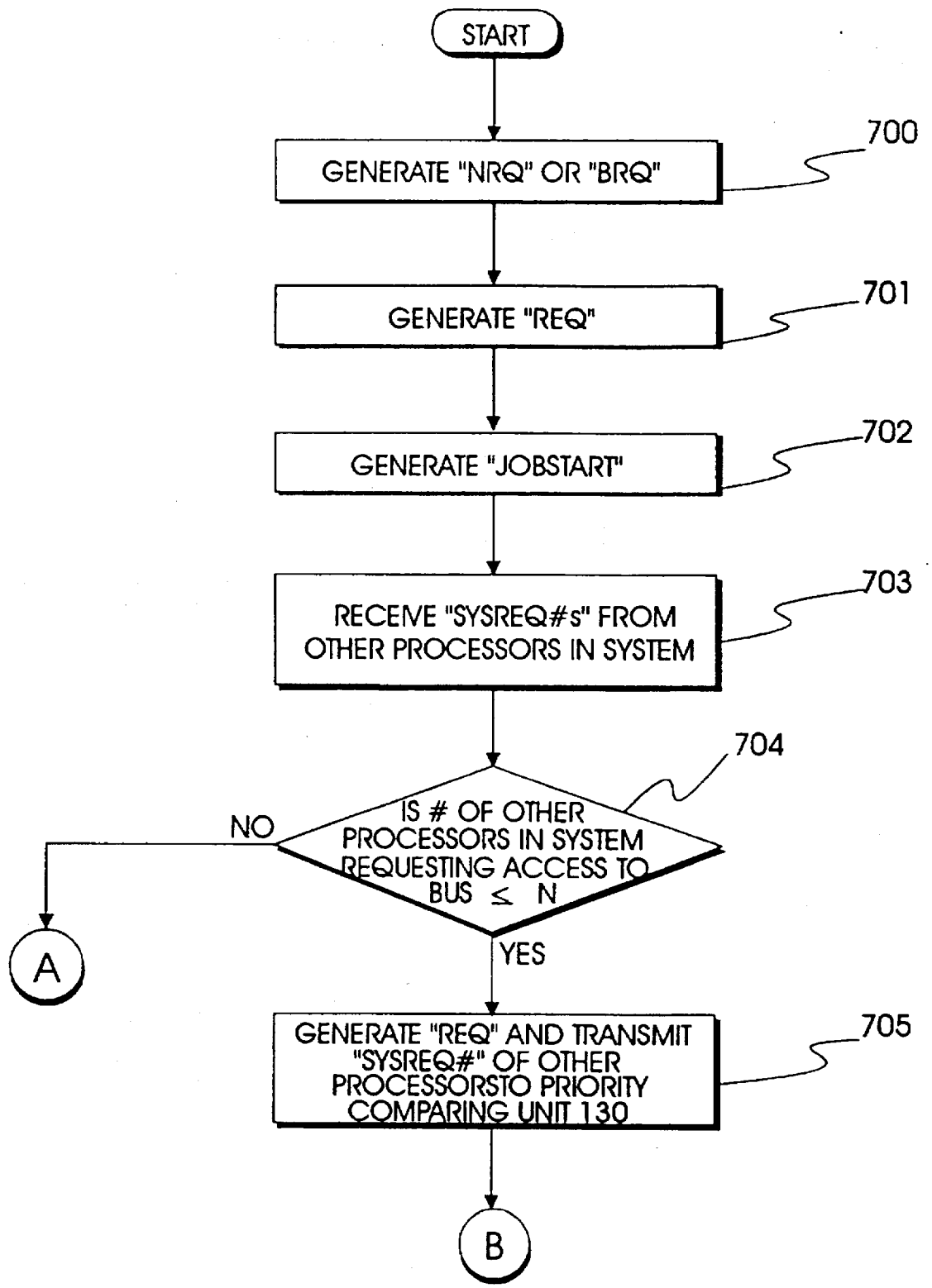
FIGS. 6A–6C are a flow chart illustrating the operation of the bus arbiter of FIG. 5 according to the principles of the present invention.
Figure 6B:
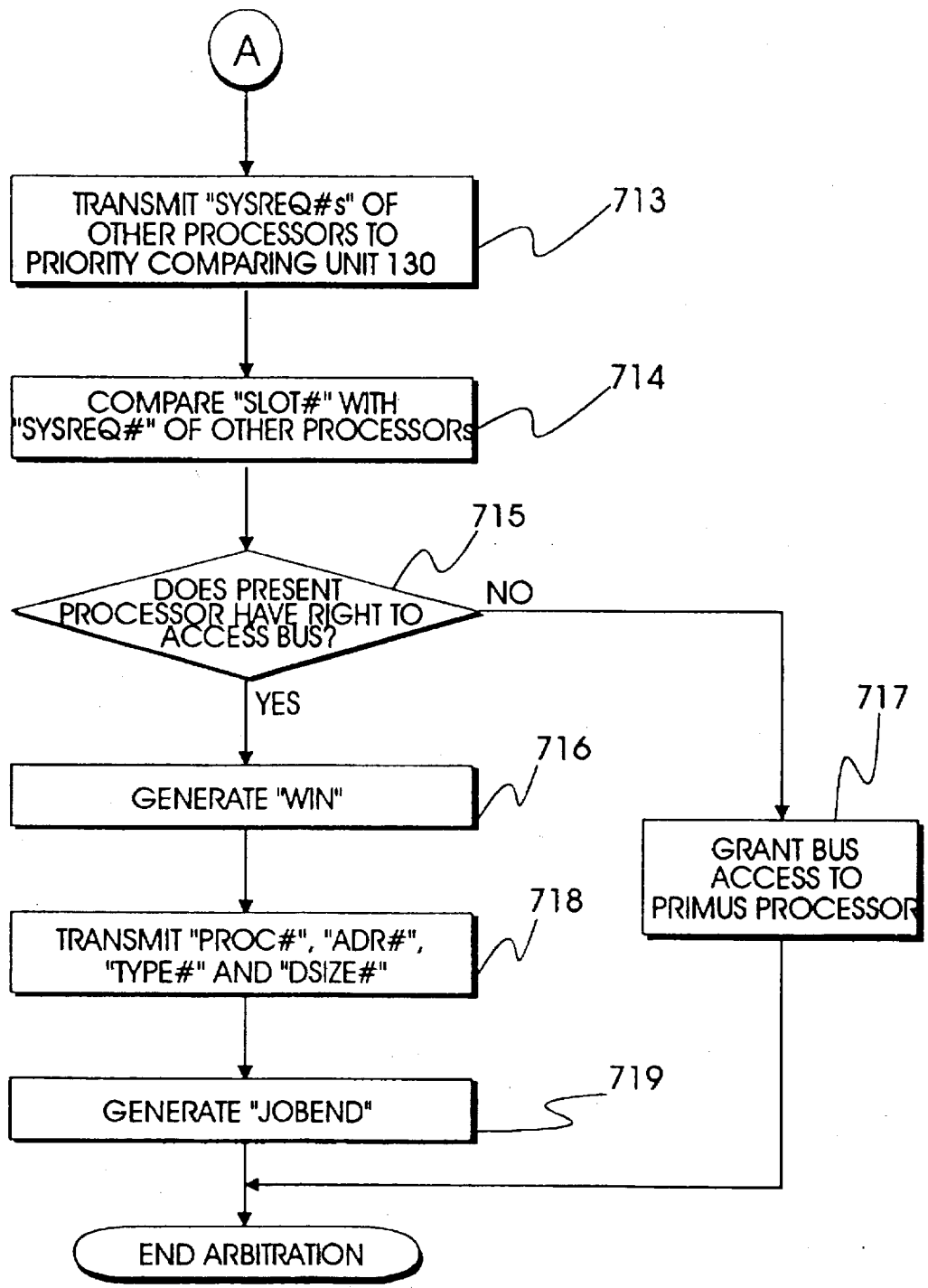
Figure 6C:
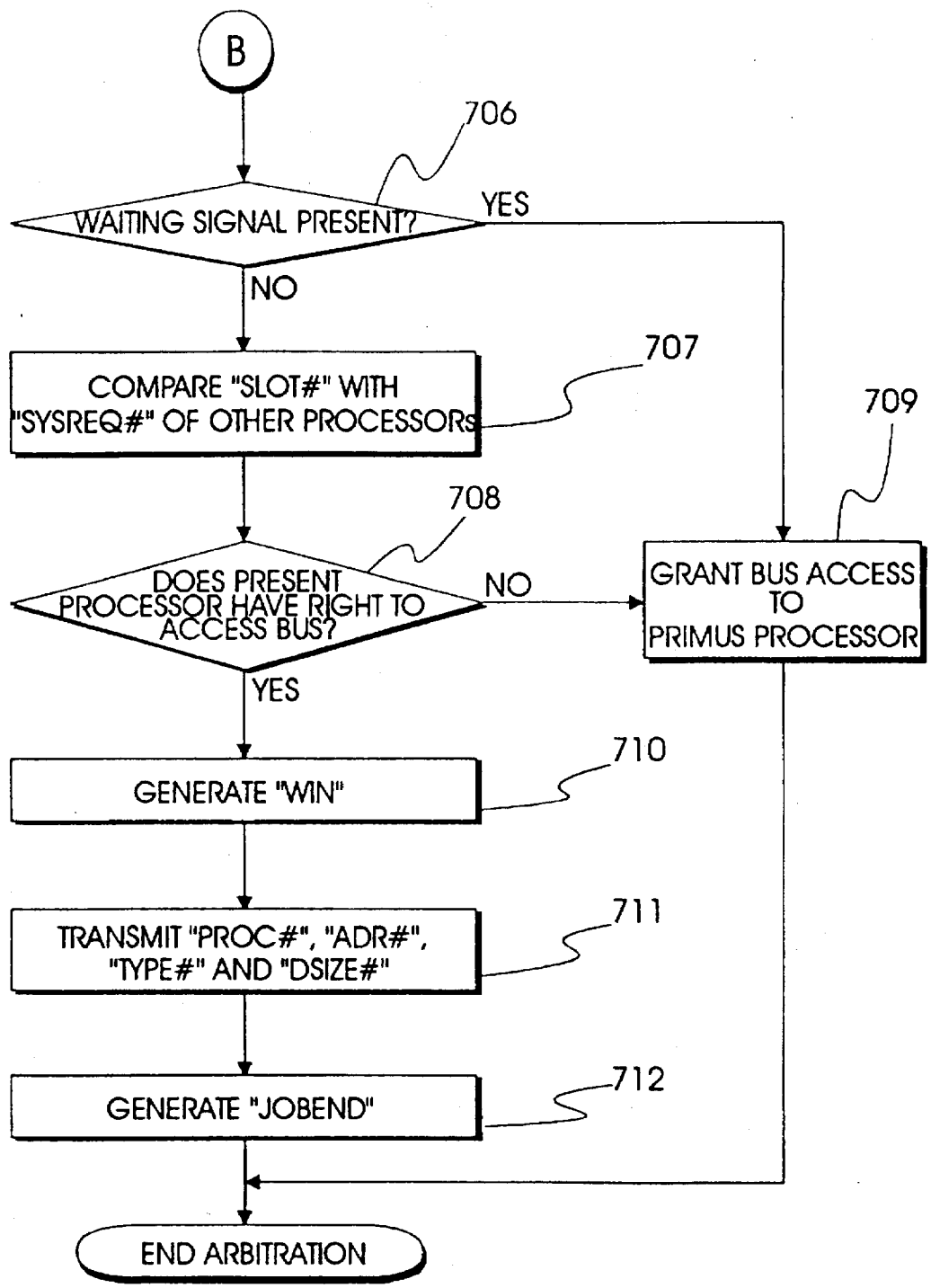

Referring to FIGS. 6A through 6C, flow charts illustrating the operation of the bus arbiter of FIG. 5 according to the principles of the present invention will now be described in detail. First, in step 700, the NRQ or BRQ signal is generated by a processor requesting access to system bus 90, and internal bus interfacing unit 110 receives the NRQ or BRQ signal. Request signal detector 112 then generates the req signal, in step 701. Next, in step 702, request signal generation controller 126 generates the JOBSTART signal in response to the req signal. In step 703, request signal generator 124 receives system request signals SYSREQ# corresponding to other processors within the system requesting access to system bus 90. In step 704, a determination is made as to whether the number of other processors in the system requesting access to system bus 90 is less than or equal to a predetermined number N (as stated earlier, N equals one in a preferred embodiment of the present invention, but any other suitable number can be used as well). If, in step 704, it is determined that the number of other processors in the system requesting access to system bus 90 is less than or equal to the predetermined number N, then request signal generator 124 generates the REQ signal and transmits the system request signals SYSREQ# corresponding to other processors within the system requesting access to system bus 90 to priority comparing unit 130, in step 705. Then, in step 706, priority comparing unit 130 determines whether a waiting signal providing a given processor absolute priority to access system bus 90 is present (this is a consideration of the aforementioned "priority" factor). If the waiting signal is present, then the processor generating the waiting signal is considered the primus processor and is granted access to system bus 90, in step 709. If no waiting signal is present, in step 706, then priority comparing unit 130 compares the SLOT# signal with the system request signals SYSREQ#s corresponding to the other processors within the system requesting access to system bus 90, in step 707. On the basis of this comparison, priority comparing unit 130 then determines whether its corresponding processor presently has the right to access system bus 90, in step 708. That is, priority comparing unit 130 determines whether its corresponding processor is the primus processor based on the round-robin scheduling method (this is a consideration of the aforementioned "fairness" factor). If, in step 708, priority comparing unit 130 determines that its corresponding processor does not have the present right to access system bus 90 based on the round-robin scheduling method, then access to system bus 90 is granted to another processor within the system considered the primus processor, in step 709. In step 708, however, if priority comparing unit 130 determines that its corresponding processor does have the present right to access system bus 90 based on the round-robin scheduling method, then the corresponding processor is considered the primus processor. Accordingly, priority comparing unit 130 then generates the WIN signal, in step 710, to grant its corresponding processor access to system bus 90. Next, in step 711, request signal generator 124 interrupts transmission of its corresponding system request signal SYSREQ#, and signal transmission circuit 140 transmits the PROC#, ADR#, TYPE# and DSIZE# signals over system bus 90. Then, in step 712, request signal generation controller 126 generates the JOBEND signal to indicate an end to the present arbitration.

Referring back to step 704, if it is determined that the number of other processors in the system requesting access to system bus 90 is not less than or equal to the predetermined number N, then request signal generator 124 does not generate the REQ signal, but transmits the system request signals SYSREQ# corresponding to other processors within the system requesting access to system bus 90 to priority comparing unit 130, in step 713. Then, in step 714, priority comparing unit 130 compares the SLOT# signal with the system request signals SYSREQ#s corresponding to the other processors within the system requesting access to system bus 90. On the basis of this comparison, priority comparing unit 130 then determines whether its corresponding processor presently has the right to access system bus 90, in step 715. Again, priority comparing unit 130 determines whether its corresponding processor is the primus processor based on the round-robin scheduling method (this is a consideration of the aforementioned "fairness" factor). If, in step 715, priority comparing unit 130 determines that its corresponding processor does not presently have the right to access system bus 90 based on the round-robin scheduling method, then access to system bus 90 is granted to another processor within the system considered the primus processor, in step 717. In step 715, however, if priority comparing unit 130 determines that its corresponding processor does have the present right to access system bus 90 based on the round-robin scheduling method, then the corresponding processor is considered the primus processor. Accordingly, priority comparing unit 130 then generates the WIN signal, in step 716, to grant its corresponding processor access to system bus 90. Next, in step 718, request signal generator 124 interrupts transmission of its corresponding system request signal SYSREQ#, and signal transmission circuit 140 transmits the PROC#, ADR#, TYPE# and DSIZE# signals over system bus 90. Then, in step 719, request signal generation controller 126 generates the JOBEND signal to indicate an end to the present arbitration.

FIGS. 7A–7J are operational waveforms of the bus arbiter of FIG. 5 according to the principles of the present invention. FIG. 7A represents system bus arbitrating clock signal ARBCLK, FIG. 7B represents internal bus clock signal LCLK, FIG. 7C represents data transmission request signal NRQ or BRQ, FIG. 7D represents the req signal, FIG. 7E represents the JOBSTART signal, FIG. 7F represents the JOBEND signal, FIG. 7G represents the REQ signal, FIG. 7H represents the WIN signal, FIG. 7I represents the system request signal SYSREQ# and FIG. 7J represents the PROC#, ADR#, TYPE# and DSIZE# signals output from signal transmission circuit 140.

FIGS. 8A–8H are operational waveforms for illustrating the operation of determining the state of system bus 90, which is performed by request signal generator 124 of FIG. 5. Assume, for purposes of explanation, that the system request signal of the corresponding processor is SYSREQ2. FIG. 8A shows a waveform representing system bus arbitrating clock signal ARBCLK. FIGS. 8B through 8F respectively show waveforms representing system request signals SYSREQ0, SYSREQ1, SYSREQ2, ..., SYSREQN within the system. FIGS. 8G and 8H are waveforms representing the req signal and the WIN signal, respectively. In response to generation of the req signal (and the JOBSTART signal which is not shown in FIGS. 8A–8H), request signal generator 124 outputs its corresponding system request signal SYSREQ2 to system bus 90 and determines the current state of system bus 90 based on system request signals SYSREQ0, SYSREQ1, SYSREQ2, ..., SYSREQN at a first falling edge 81 of the system bus arbitrating clock signal ARBCLK. Since system request signals SYSREQ0 and SYSREQ1 are represented on system bus 90 at first falling edge 81 of system bus arbitrating clock signal ARBCLK, (that is, two other processors within the system are currently requesting access to system bus 90), request signal generator 124 can not generate the REQ signal. Next, at a second falling edge 82 of system bus arbitrating clock signal ARBCLK, since only system request signal SYSREQ1 is represented on system bus 90, priority comparing unit 130 then generates the WIN signal and request signal generator 124 interrupts transmission of system request signal SYSREQ2.

FIGS. 9A–9J are operational waveforms illustrating the operation for determining which processor has a present right of access to system bus 90 according to the principles of the present invention. This operation is performed by priority comparing unit 130 after the REQ signal is generated by request signal generator 124. Assume, for purposes of explanation, that the system request signal of the corresponding processor is SYSREQ2. FIG. 9A is waveform representing system bus arbitrating clock signal ARBCLK. FIGS. 9B–9F are waveforms respectively representing system request signals SYSREQ0, SYSREQ1, SYSREQ2, SYSREQ3..., SYSREQN on system bus 90. FIGS. 9G and 9H are waveforms representing the REQ signal and the WIN signal, respectively. FIG. 9I is waveform representing signals PROC#, ADR#, TYPE# and DSIZE# transmitted over system bus 90 from signal transmission circuit 140, and FIG. 9I is waveform representing the waiting signal. Assume, in accordance with the "fairness" factor, that the designated order of access to system bus 90 is SYSREQN, ..., SYSREQ2, SYSREQ1, SYSREQ0.

At a first falling edge 91 of system bus arbitrating clock ARBCLK, priority comparing unit 130 determines which processor has the present right to access system bus 90. First, presence of the waiting signal is checked for. When the waiting signal is not present, access to system bus 90 is determined on the basis of the "fairness" factor using the round-robin scheduling method and the access order designated above. If the waiting signal is present, the processor generating the waiting signal is considered the primus processor and current access to system bus 90 is granted to that processor (this is based on the "priority" factor). That is, the primus processor which generates the waiting signal stores a bit so it has absolute priority to use system bus 90. Also, the processor generating the waiting signal has a function of delaying the arbitration of other processors to maintain a normal protocol when that processor uses system bus 90 to transmit data. At falling edge 91, since system request signals SYSREQ1, SYSREQ2 and SYSREQ3 exist on system bus 90, the corresponding processor (i.e., the processor generating SYSREQ2) cannot use system bus 90 based on the "fairness" factor. That is, the processor generating SYSREQ3 is considered the primus processor and it possesses the present right to use system bus 90 based on the access order designated above. Next, at a second falling edge 92, since the generation of SYSREQ3 is interrupted, the next processor in line to use system bus 150 will be considered the primus processor. According to the access order designated above, this is the processor corresponding to system request signal SYSREQ2. Therefore, priority comparing unit 130 of the corresponding processor generates the WIN signal to provide access to system bus 90. Next, signal transmitting circuit 140 transmits the PROC#, ADR#, TYPE# and DSIZE# signals over system bus 90.

As described above, according to the principles of the present invention, the number of processors requesting access to system bus 90 is first determined and the priority of a corresponding processor is considered only when the number of processors requesting access is below a predetermined number. That is, the "fairness" factor regarding bus access is considered exclusively when the predetermined condition is not satisfied, and the "priority" factor is considered only when the predetermined condition is satisfied. Therefore, the disadvantages of a long bus access time associated with methods which consider only one of the "priority" and "fairness" factors is avoided.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A bus arbitration method, comprising the steps of:

detecting a request signal indicating that a first processor out of a plurality of processors in a system requests access to a system bus common to said plurality of processors;

calculating a number representative of how many of said plurality of processors, other than said first processor, are requesting access to said system bus;

determining whether said number is below a predetermined number;

when said number is below said predetermined number, comparing priorities of said first processor and said plurality of processors, other than said first processor, that are requesting access to said system bus; and providing access to said system bus for one of said plurality of processors requesting access to said system bus and having a highest priority.

2. The bus arbitration method as claimed in claim 1, further comprising a step of generating a waiting signal for delaying arbitration of another one of said plurality of processors requesting access to said system bus while said one of said plurality of processors having said highest priority accesses said system bus.

3. The method of claim 1, further comprised of:

said one of said plurality of processors having access to use said system bus temporarily delaying arbitration of another request for access to said system bus by another one of said plurality of processors requesting access to said system bus while said one of said plurality of processors accesses said system bus.

4. A bus arbitration method, comprising the steps of:

detecting a request signal indicating that a first processor out of a plurality of processors in a system requests access to a system bus common to said plurality of processors;

calculating a number representative of how many of said plurality of processors, other than said first processor, are requesting access to said system bus;

when said number is below a predetermined number, determining whether a waiting signal has been generated by one of said plurality of processors requesting access to said system bus;

when said waiting signal has been generated, providing access to said system bus for said one of said plurality of processors that generated said waiting signal; and when said number is not below said predetermined number, providing access to said system bus for one of said plurality of processors requesting access to said system bus and having a highest ranking according to a round-robin schedule that sequentially assigns said highest ranking to each one of said plurality of processors in said system.

5. The method of claim 4, further comprised of:

storing representations of each of said requests by said plurality of processors in the system, before calculating said number; and said one of said plurality of processors having access to use said system bus temporarily delaying arbitration of another request for access to said system bus by another one of said plurality of processors requesting access to said system bus while said one of said plurality of processors accesses said system bus.

6. A device for arbitrating among a plurality of processors in a system having a system bus common to said plurality of processors, said device comprising:

request signal processing means for determining a number representative of how many of said plurality of processors are requesting access to said system bus, and for generating a control signal when said representative number is below a predetermined number; and priority comparing means for detecting, in response to said control signal, a waiting signal generated by one of said plurality of processors requesting access to said system bus, said priority comparing means allowing access to said system bus for said one of said plurality of processors that generated said waiting signal when said waiting signal is detected, and when said control signal is not detected, said priority comparing means allowing access to said system bus for one of said plurality of processors requesting access to said system bus having a highest ranking according to a round-robin schedule that sequentially assigns said highest ranking to each one of said plurality of processors in said system.

7. The device as claimed in claim 6, wherein said request signal processing means comprises:

a request signal detector for detecting a request signal indicative of a request by a corresponding one of said plurality of processors to access said system bus; and a request signal generator for determining, in response to detection of said request signal, said number representative of how many of said plurality of processors are requesting access to said system bus, and for generating said control signal when said number is below said predetermined number.

8. The device as claimed in claim 7, wherein said request signal processing means further comprises a request signal generation controller for controlling operation of said request signal generator in response to the detection of said request signal.

9. The device claimed in claim 7, comprised of said corresponding one of said plurality of processors having current access to use said system bus temporarily delaying arbitration of another request for access to said system bus by another one of said plurality of processors requesting access to said system bus while said corresponding one of said plurality of processors accesses said system bus.

10. The device as claimed in claim 7, further comprising signal transmission means for transmitting data from said corresponding one of said plurality of processors to said system bus when said corresponding one of said plurality of processors is provided access to said system bus.

11. The device as claimed in claim 10, wherein said signal transmission means comprises:
first means for transmitting a first signal identifying said corresponding one of said plurality of processors;
second means for transmitting a second signal representative of one of a read operation and a write operation to be performed by said corresponding one of said plurality of processors;
third means for transmitting a third signal representative of an address within said system where said read operation or said write operation will be performed; and
fourth means for transmitting a fourth signal representative of a number of bits involved in said read operation or said write operation.

12. A bus arbitration method, comprising the steps of:
detecting a request signal indicating that a first processor out of a plurality of processors in a system requests access to a system bus common to said plurality of processors;
computing a number representative of how many of said plurality of processors, other than said first processor, are requesting access to said system bus;
when said number is below a predetermined number, determining whether one of said plurality of processors requesting access to said system bus has a priority in accessing said system bus;
when one of said plurality of processors requesting access to said system bus has said priority, providing access to said system bus for said one of said plurality of processors having said priority; and
when said number is not below said predetermined number, providing access to said system bus for one of said plurality of processors requesting access to said system bus and having a highest ranking according to a round-robin schedule that sequentially assigns said highest ranking to each one of said plurality of processors in said system.

13. The bus arbitration method as claimed in claim 10, further comprising a step of generating a waiting signal for delaying arbitration of another one of said plurality of processors requesting access to said system bus while said one of said plurality of processors having said priority accesses said system bus.

14. The method of claim 12, further comprised of:
storing representations of each of said requests by said plurality of processors in the system, before computing said number; and said one of said plurality of processors having access to use said system bus temporarily delaying arbitration of another request for access to said system bus by another one of said plurality of processors requesting access to said system bus while said one of said plurality of processors accesses said system bus.

15. A device for arbitrating among a plurality of processors in a system having a system bus common to said plurality of processors, said device comprising:
request signal processing means for determining a number representative of how many of said plurality of processors are requesting access to said system bus, and for generating a control signal when said number is below a predetermined number; and
priority comparing means for comparing priorities among said plurality of processors requesting access to said system bus and allowing access to said system bus for one of said plurality of processors that has a highest priority when said control signal is generated, and when said control signal is not generated, said priority comparing means allowing access to said system bus for one of said plurality of processors requesting access to said system bus having a highest ranking according to a round-robin schedule that sequentially assigns said highest ranking to each one of said plurality of processors in said system.

16. The device as claimed in claim 15, wherein said request signal processing means comprises:
a request signal detector for detecting a request signal indicative of a request by a corresponding one of said plurality of processors to access said system bus; and
a request signal generator for determining, in response to detection of said request signal, said number representative of how many of said plurality of processors are requesting access to said system bus, and for generating said control signal when said number is below said predetermined number.

17. The device as claimed in claim 16, wherein said request signal processing means further comprises a request signal generation controller for controlling operation of said request signal generator in response to the detection of said request signal.

18. The device as claimed in claim 16, wherein said request signal generator generates a waiting signal for delaying arbitration of another one of said plurality of processors requesting access to said system bus while said corresponding one of said plurality of processors accesses said system bus.

19. The device as claimed in claim 16, further comprising signal transmission means for transmitting data from said corresponding one of said plurality of processors to said system bus when said corresponding one of said plurality of processors is provided access to said system bus.

20. The device as claimed in claim 19, wherein said signal transmission means comprises:
first means for transmitting a first signal identifying said corresponding one of said plurality of processors;
second means for transmitting a second signal representative of one of a read operation and a write operation to be performed by said corresponding one of said plurality of processors;
third means for transmitting a third signal representative of an address within said system where said read operation or said write operation will be performed; and
fourth means for transmitting a fourth signal representative of a number of bits involved in said read operation or said write operation.

21. The device as claimed in claim 15, wherein when said control signal has been generated and none of said plurality of processors requesting access to said system bus has said highest priority, access to said system bus is provided to said one of said plurality of processors requesting access to said system bus having said highest ranking according to said round-robin schedule that sequentially assigns said highest ranking to each one of said plurality of processors in said system.

22. A bus arbitration method, comprising the steps of:

detecting a request signal indicating that a first processor out of a plurality of processors in a system requests access to a system bus common to said plurality of processors;

determining whether a number of said plurality of processors, other than said first processor, requesting access to said system bus is less than or equal to a predetermined number;

when said number is less than or equal to said predetermined number, comparing priorities of said first processor and said plurality of processors, other than said first processor, requesting access to said system bus; and providing access to said system bus for one of said plurality of processors requesting access to said system bus and having a highest priority.

23. The bus arbitration method as claimed in claim 22, further comprising a step of generating a waiting signal for delaying arbitration of another one of said plurality of processors requesting access to said system bus while said one of said plurality of processors having said highest priority accesses said system bus.

* * * * *